:::

(12) United States Patent
Wu

(10) Patent No.: US 8,702,261 B2
(45) Date of Patent: Apr. 22, 2014

(54) BACKLIGHT MODULE, CONNECTING ELEMENT AND DISASSEMBLY METHOD THEREOF

(75) Inventor: Yue Wu, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 132 days.

(21) Appl. No.: 13/578,252

(22) PCT Filed: Jul. 11, 2012

(86) PCT No.: PCT/CN2012/078459
§ 371 (c)(1),
(2), (4) Date: Aug. 10, 2012

(87) PCT Pub. No.: WO2014/005346
PCT Pub. Date: Jan. 9, 2014

(65) Prior Publication Data
US 2014/0009907 A1   Jan. 9, 2014

(51) Int. Cl.
*G09F 13/04* (2006.01)
*F16B 5/00* (2006.01)

(52) U.S. Cl.
CPC .................................. *F16B 5/0088* (2013.01)
USPC .......... 362/97.1; 362/632; 403/226; 29/426.5

(58) Field of Classification Search
CPC ...................................................... G09F 13/04
USPC ......... 362/97.1, 632; 403/226, 227; 29/426.5, 29/446, 525, 426.6
See application file for complete search history.

(56) References Cited

U.S. PATENT DOCUMENTS

| 6,877,990 B2* | 4/2005 | Liao et al. ........................ 439/41 |
| 7,234,955 B1* | 6/2007 | Ho ................................. 439/331 |
| 7,677,912 B2* | 3/2010 | Zhang ............................ 439/331 |
| 2008/0143919 A1* | 6/2008 | Azuma et al. .................... 349/58 |
| 2009/0219724 A1* | 9/2009 | Wang et al. ..................... 362/362 |

* cited by examiner

*Primary Examiner* — Ali Alavi
(74) *Attorney, Agent, or Firm* — Andrew C. Cheng

(57) ABSTRACT

The present invention provides connecting element, which includes mold frame and back plate; side of back plate disposed with convex bump unit having a bottom surface, side of mold frame disposed with opening having elastic latch unit inside, latch unit having latch hook part with top surface; wherein bottom surface of convex bump unit contacting to push top surface of latch hook part to make latch unit and convex bump unit fitly engaged, side of top surface of latch hook part near free end of latch hook part higher than bottom surface of convex bump unit. The invention also provides backlight module and disassembly method. Through designing different latch unit and convex bump unit, the invention effectively prevents latch hook part from springing back and damages caused by repetitive flipping latch hook part during disassembly. The invention ensures easy assembly/disassembly and reduces cost.

15 Claims, 7 Drawing Sheets

BACKLIGHT MODULE, CONNECTING ELEMENT AND DISASSEMBLY METHOD THEREOF

BACKGROUND OF THE INVENTION

1. Field of the Invention

The present invention relates to the field of liquid crystal displaying techniques, and in particular to a connecting element and disassembly method thereof. The present invention also related to a backlight module utilizing the connecting element.

2. The Related Arts

The known structure of a liquid crystal display device mainly comprises panel frame, glass substrate and backlight module. Mold frame and back plate of the backlight module are usually fitted by using screws or ad hoc latch hooks. The former requires the back plate and mold frame to be disposed with inner screw holes and use screws through inner screw holes to draw the back plate and mold frame together. Because screws are used, additional material cost and longer assembly/disassembly process have a negative effect on the yield rate. The latter, as shown in FIG. 1, requires the side of the mold frame to be disposed with elastic latch hook 101 and the same side of the back plate to be disposed with convex bump 102 corresponding to elastic latch hook 101. For installation, under an external force, elastic latch hook 101 can be engaged to convex bump 102 tightly so as to draw the back plate and the mold frame together tightly. The shortcoming of this approach is that, during the disassembly process, when elastic latch hook 101 is flipped to be disengaged from convex bump 102, elastic latch hook 101 often snaps to origin position to engage with convex bump 102 again due to elasticity because the bottom of elastic latch hook 101 and the bottom of convex bump 102 are at a same level. Many trials often must be taken before disengaging elastic latch hook 101 from convex bump 102 successfully, which is a major inconvenience in disassembling mold frame and the back plate. In addition, multiple trials often renders elastic latch hook 101 damaged due to repetitive flipping.

SUMMARY OF THE INVENTION

The technical issue to be addressed by the present invention is to provide a connecting element having a simple structure and easy for assembly and disassembly to solve the problems of complicated and time-consuming assembly/disassembly process affecting the yield rate in the known technique.

The present invention provides a connecting element, which comprises: a mold frame and a back plate; a side of the back plate being disposed with a convex bump unit, the convex bump unit having a bottom surface, a side of mold frame being disposed with an opening, the opening having an elastic latch unit disposed inside, the latch unit having a latch hook part, the latch hook part having a top surface; wherein, the bottom surface of the convex bump unit contacting to push the top surface of the latch hook part so as to make the latch unit and the convex bump unit fitly engaged, a side of the top surface of the latch hook part near free end of the latch hook part being higher than the bottom surface of the convex bump unit.

According to a preferred embodiment of the present invention, the latch unit further comprises a support part, the support part and the latch hook part are monolithically formed with a bending larger than or equal to 90°.

According to a preferred embodiment of the present invention, the latch unit comprises a left latch element and a right latch element, the convex bump unit comprises a left convex bump and a right convex bump, the left latch element engages the left convex bump and the right latch element engages the right convex bump.

According to a preferred embodiment of the present invention, the left latch element and the right latch element are both disposed between the left convex bump and the right convex bump, the support part of the left latch element tilts from the top of the opening towards the left convex bump, and the support part of the right latch element tilts from the top of the opening towards the right convex bump.

According to a preferred embodiment of the present invention, the left latch element is disposed at left side of the left convex bump, the right latch element is disposed at right side of the right convex bump, the support part of the left latch element tilts from the top of the opening towards the left convex bump, and the support part of the right latch element tilts from the top of the opening towards the right convex bump.

According to a preferred embodiment of the present invention, the latch unit further comprises a support part, the support part and the latch hook part are monolithically formed with a bending less than or equal to 90°; the latch hook part comprises a left latch hook and a right latch hook, the left latch hook, the right latch hook and the support part are monolithically formed; the support part is disposed in parallel with the left convex bump and the right convex bump; the convex bump part comprises the left convex bump and the right convex bump; the latch unit is disposed between the left convex bump and the right convex bump, the left latch hook engages the left convex bump and the right latch hook engages the right convex bump.

According to a preferred embodiment of the present invention, the left convex bump and the right convex bump are monolithically formed and show a bend of specific angle; the left latch element is disposed at left side of the left convex bump, the right latch element is disposed at right side of the right convex bump, the support part of the left latch element tilts from the top of the opening towards the left convex bump, and the support part of the right latch element tilts from the top of the opening towards the right convex bump.

The present invention provides a backlight module, which comprises: a mold frame and a back plate; a side of the back plate being disposed with a convex bump unit, the convex bump unit having a bottom surface, a side of mold frame being disposed with an opening, the opening having an elastic latch unit disposed inside, the latch unit having a latch hook part, the latch hook part having a top surface; wherein, the bottom surface of the convex bump unit contacting to push the top surface of the latch hook part so as to make the latch unit and the convex bump unit fitly engaged, a side of the top surface of the latch hook part near free end of the latch hook part being higher than the bottom surface of the convex bump unit.

According to a preferred embodiment of the present invention, the latch unit further comprises a support part, the support part and the latch hook part are monolithically formed with a bending larger than or equal to 90°.

According to a preferred embodiment of the present invention, the latch unit comprises a left latch element and a right latch element, the convex bump unit comprises a left convex bump and a right convex bump, the left latch element engages the left convex bump and the right latch element engages the right convex bump.

According to a preferred embodiment of the present invention, the left latch element and the right latch element are both disposed between the left convex bump and the right convex bump, the support part of the left latch element tilts from the top of the opening towards the left convex bump, and the support part of the right latch element tilts from the top of the opening towards the right convex bump.

According to a preferred embodiment of the present invention, the left latch element is disposed at left side of the left convex bump, the right latch element is disposed at right side of the right convex bump, the support part of the left latch element tilts from the top of the opening towards the left convex bump, and the support part of the right latch element tilts from the top of the opening towards the right convex bump.

According to a preferred embodiment of the present invention, the latch unit further comprises a support part, the support part and the latch hook part are monolithically formed with a bending less than or equal to 90°; the latch hook part comprises a left latch hook and a right latch hook, the left latch hook, the right latch hook and the support part are monolithically formed; the support part is disposed in parallel with the left convex bump and the right convex bump; the convex bump part comprises the left convex bump and the right convex bump; the latch unit is disposed between the left convex bump and the right convex bump, the left latch hook engages the left convex bump and the right latch hook engages the right convex bump.

According to a preferred embodiment of the present invention, the left convex bump and the right convex bump are monolithically formed and show a bend of specific angle; the left latch element is disposed at left side of the left convex bump, the right latch element is disposed at right side of the right convex bump, the support part of the left latch element tilts from the top of the opening towards the left convex bump, and the support part of the right latch element tilts from the top of the opening towards the right convex bump.

The present invention provides a disassembly method for connecting element, which comprises; push and press step, pushing and pressing the latch unit in a direction away from the convex bump unit on the back plate so that the latch unit showing elastic deformation to disengage from the bottom surface of the convex bump unit and push against a side of the convex bump unit; and raise and disengage step, raising the mold frame, the latch unit sliding upwards along the side of convex bump unit to disengage the latch unit from the convex bump unit.

The efficacy of the present invention is that to be distinguished from the state of the art. The connecting element of the present invention disposes an elastic latch unit on a side of the mold frame and a convex bump unit on a corresponding side of the back plate. The latch unit and the convex bump unit are engaged to latch. A side of the top surface of the latch hook part of the latch unit near free end of the latch hook part is higher than the bottom surface of the convex bump unit. The connecting element of the present invention can effectively prevent the latch hook part of the latch unit of mold frame from restoring due to the elasticity as well as damage caused by repetitive flipping the latch hook part during the disassembly process. The present invention can ensure easy assembly and disassembly of the mold frame and the back plate as well as reduce cost.

BRIEF DESCRIPTION OF THE DRAWINGS

To make the technical solution of the embodiments according to the present invention, a brief description of the drawings that are necessary for the illustration of the embodiments will be given as follows. Apparently, the drawings described below show only example embodiments of the present invention and for those having ordinary skills in the art, other drawings may be easily obtained from these drawings without paying any creative effort. In the drawings.

DETAILED DESCRIPTION OF THE PREFERRED EMBODIMENTS

Figure 1:
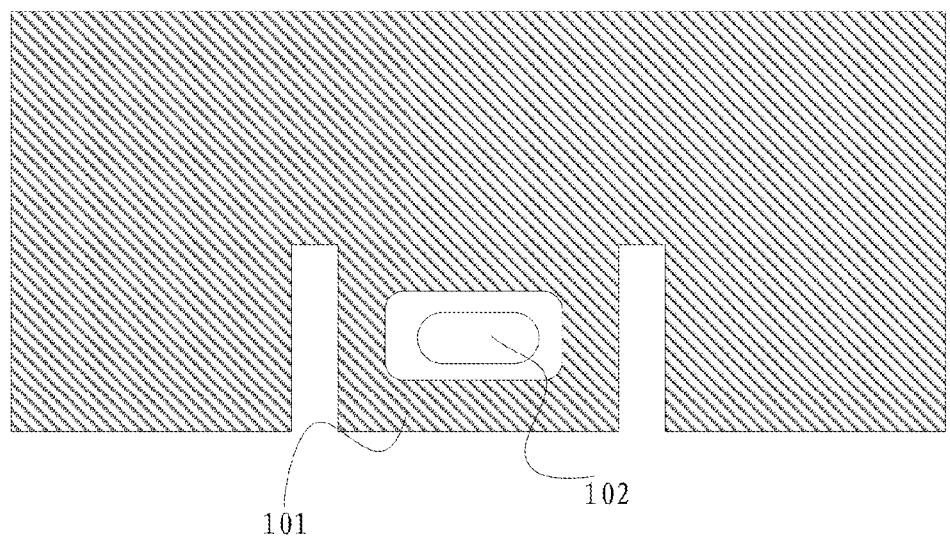
FIG. 1 is a schematic view showing the structure of a known connecting element.

The following provides a clear and complete description of the technical solution according to the present invention using the drawing and the embodiment. Apparently, the drawings described below show only example embodiments of the present invention, instead of all embodiments. For other embodiments based on the disclosed drawings and embodiments, and obtained by those having ordinary skills in the art without paying any creative effort are also within the scope of the present invention.

First Embodiment

Figure 2:
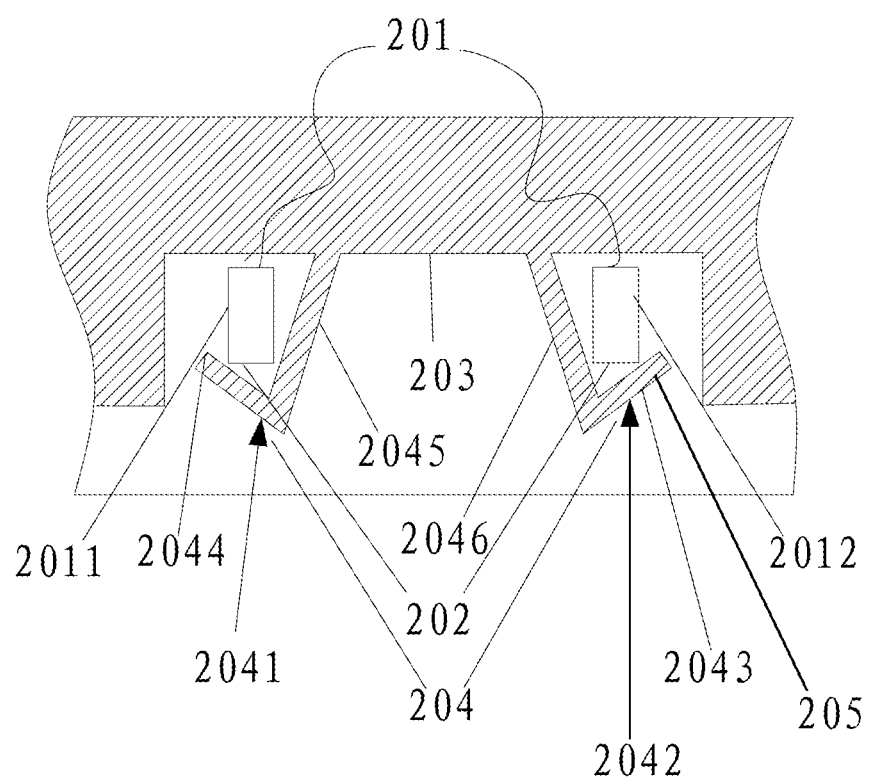
FIG. 2 is a schematic view showing the structure of the first embodiment of a connecting element of the present invention.

Referring FIG. 2, FIG. 2 is a schematic view showing the structure of the first embodiment of a connecting element of the present invention. In the instant embodiment, the present embodiment provides a connecting element, which comprises: a mold frame and a back plate. The mold frame is usually made of plastic material by molding process and can also be formed by assembling a plurality of parts made of a same plastic material. The back plate is usually made of metal bended by mold stamping. The mold frame and the back plate both are disposed with corresponding sides The side of the back plate is disposed with a convex bump unit 201. Convex bump unit 201 and back plate are monolithically farmed. The side of mold frame is disposed with an opening 203. Opening 203 has an elastic latch unit 204 disposed inside. Latch unit 204 and mold frame are monolithically formed. Latch unit 204 comprises a latch hook part 2043, a left support part 2045 and a right support part 2046. Both left support part 2045 and right support part 2046 are monolithically formed with latch hook part 2043, with a bending larger than or equal to 90°. In other embodiments, left support part 2045 and right support part 2046 can be connected and fastened to latch hook part 2043 by inlaying, rivet or screw. Convex bump unit 201 has a bottom surface 202. Latch hook part 2043 a top surface 2044, wherein bottom surface 202 of convex bump unit 201 contacts to push top surface 2044 of latch hook part 2043 so as to make latch unit 204 and convex bump unit 201 fitly engaged. A side 205 of top surface 2044 of latch hook part 2043 near free end of latch hook part 2043 is higher than bottom surface 202 of convex bump unit 201.

In the instant embodiment, latch unit 204 comprises a left latch element 2041 and a right latch element 2042. Convex bump unit 201 comprises a left convex bump 2011 and a right convex bump 2012. Left latch element 2041 engages left convex bump 2011 and right latch element 2042 engages right convex bump 2012. Left latch element 2041 and right latch element 2042 are both disposed between left convex bump 2011 and right convex bump 2012. Support part 2045 of left latch element 2041 tilts from the top of opening 203 towards left convex bump 2011, and support part 2046 of right latch element 2042 tilts from the top of opening 203 towards t right convex bump 2012.

Figure 3:
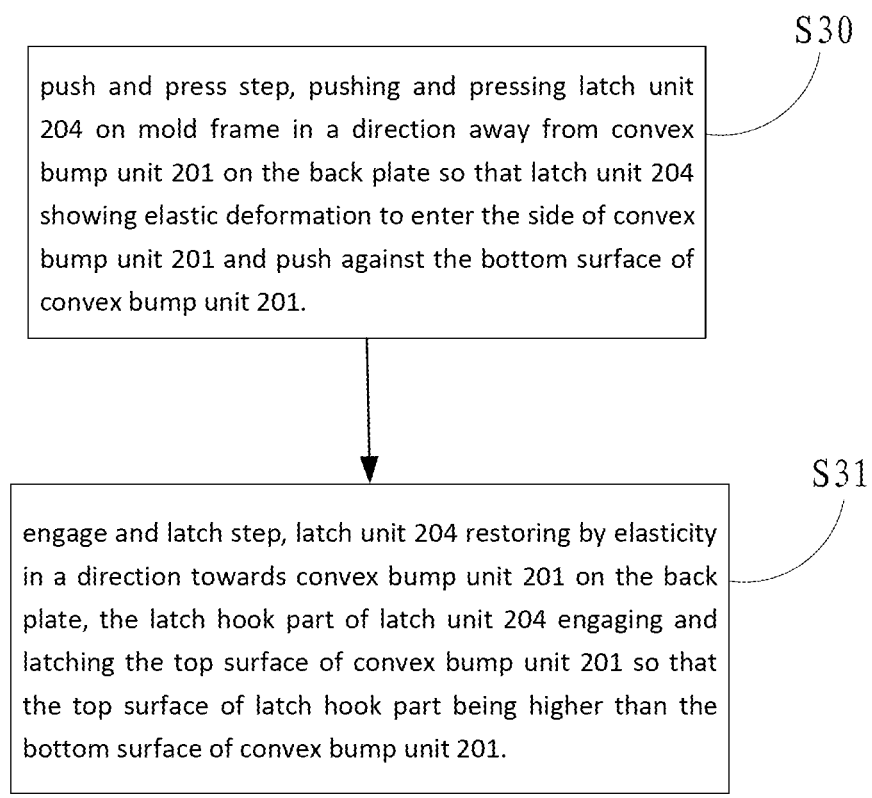
FIG. 3 is a flowchart of assembly method for the connecting element in FIG. 2.

The following describes an assembly method of the present embodiment. Also referring to FIG. 3, FIG. 3 is a flowchart of assembly method for the connecting element in FIG. 2.

Step S30: a push and press step, pushing and pressing latch unit 204 on mold frame in a direction away from convex bump unit 201 on the back plate so that latch unit 204 showing elastic deformation to enter the side of convex bump unit 201 and push against the bottom surface of convex bump unit 201.

When engaged fitly to latch, mold frame and back plate are aligned. At this point, latch unit 204 can deform due to elasticity by pushing downwards. Left latch element 2041 and right latch element 2042 will slide downward along the inner side of the convex bump until the bottom end. The inner side refers to the corresponding side of left convex bum and right convex bump facing left latch element and right latch element.

Step S31: an engage and latch step, latch unit 204 restoring by elasticity in a direction towards convex bump unit 201 on the back plate, the latch hook part of latch unit 204 engaging and latching the top surface of convex bump unit 201 so that the top surface of latch hook part being higher than the bottom surface of convex bump unit 201.

Because latch hook part 2043 of mold frame has elasticity, top surfaces of latch hook parts 2043 of left latch element 2041 and right latch element 2042 hook bottom surface 202 of convex bump, and top surface 2044 of latch hook part is higher than bottom surface 202 of convex bump so as to fasten and refrain effectively. Based on actual technique, the bending angle of latch hook part must be larger than or equal to 90°; therefore, the latch hook part is designed to include a 100° tilt angle to ensure that top surface 2044 of latch hook part 2043 is higher than bottom surface 202 of convex bump to fasten and refrain effectively when hooking convex bump on the back plate. The above angles are only illustrative, not restrictive, and the latch hook part designed with other angles is also within the scope of the present invention.

Furthermore, in the instant embodiment, a plurality of latch units 204 is disposed on the sides surrounding the mold frame, and a plurality of convex bump units 201 is disposed on the sides surrounding the back plate. Each of latch units 204 matches each of convex bump units 201. In actual application, the numbers of latch units 204 and convex bump units 201 can be determined by the number of modules must be controlled during assembling and disassembling the backlight module. Through fastening by a plurality of latch units 204 and a plurality of convex bump units 201, the assembly process can be more efficient and improve the life span of latch units 204.

Figure 4:
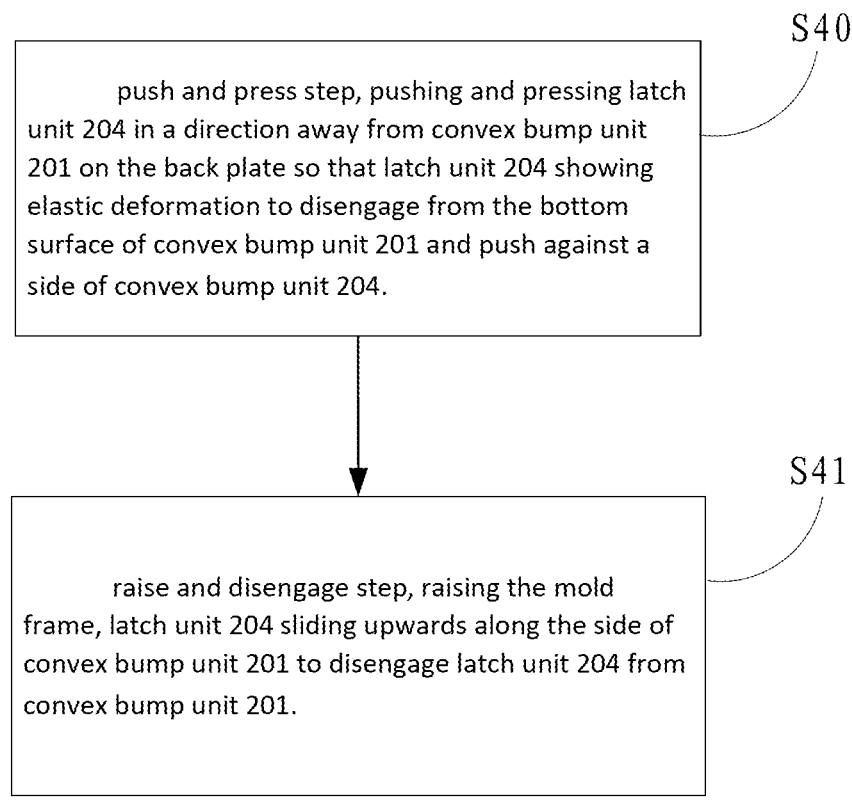
FIG. 4 is a flowchart of disassembly method for the connecting element in FIG. 2.

To disassemble connecting element, the embodiment of the present invention provides a disassembly method. Refer to FIGS. 2-4, FIG. 4 is a flowchart of disassembly method for the connecting element in FIG. 2. The disassembly method of the connecting element comprises the following steps:

Step S40: a push and press step, pushing and pressing latch unit 204 in a direction away from convex bump unit 201 on the back plate so that latch unit 204 showing elastic deformation to disengage from the bottom surface of convex bump unit 201 and push against a side of convex bump unit 204.

In the instant embodiment, latch unit 204 is made of plastic material with better elasticity, such as, thermoplastic polyurethane, thermoplastic vulcanizates, and thermoplastic polyurethane resin. Through the use of the above plastic material, latch unit 204 has good elasticity when either pushed downward to press against convex bump unit 201 or pushed upwards to disengage from convex bump unit 201. In addition, because the elasticity of the plastic, latch unit 204 can tightly engaged to convex bump unit 201 to improve the safety of the process. Furthermore, during disassembly, because of elasticity, latch unit 204 can be easily disengaged from convex bump unit 201 when pushed in a direction opposite to the engagement. As such, the efficiency is improved. The elastic material can be recycled according to the actual technique in selecting plastic with suitable elasticity.

Step S41: a raise and disengage step, raising the mold frame, latch unit 204 sliding upwards along the side of convex bump unit 201 to disengage latch unit 204 from convex bump unit 201.

In the raise and disengage step, because latch unit 204 is made of plastic material, latch unit 204 will not scratch or damage convex bump unit 201. Because convex bump unit 201 is formed by stamping technique, bottom surface of convex bump unit 201 can be easily matching latch hook part of latch unit 204. During the raise and disengage step, latch unit 204 can be easily disengaged from convex bump unit 201 by pressing.

Second Embodiment

Figure 5:
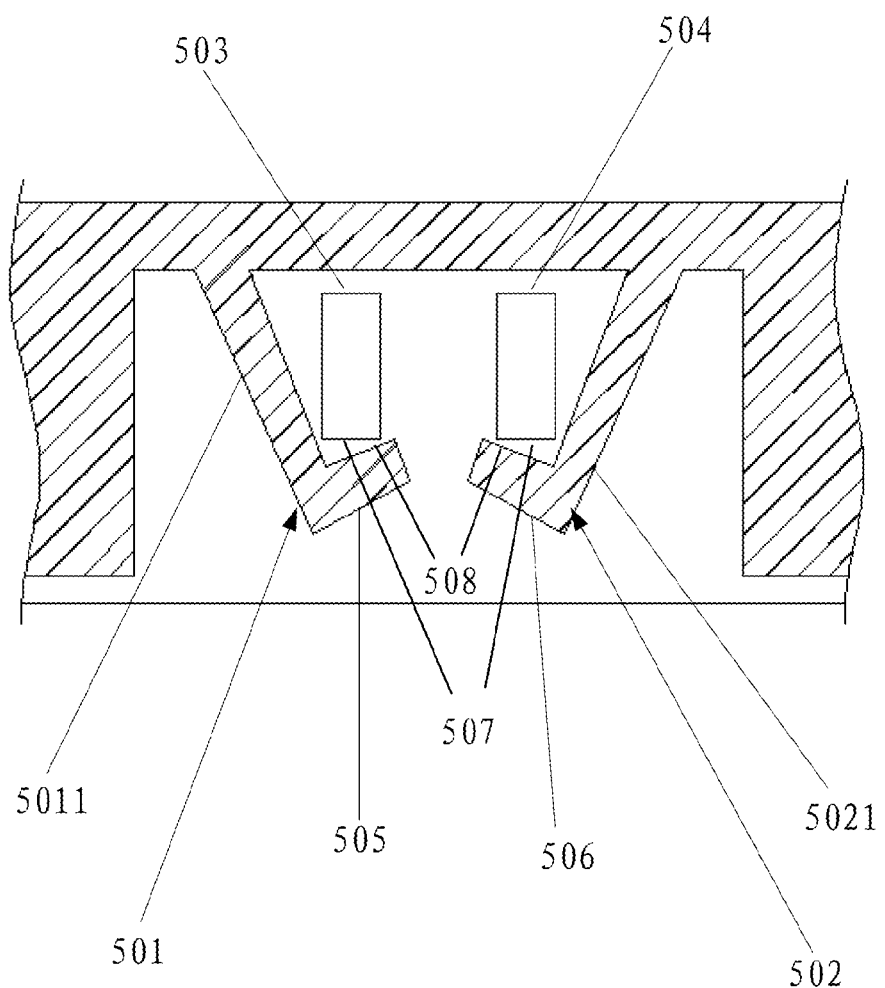
FIG. 5 is a schematic view showing the structure of the second embodiment of a connecting element of the present invention.

Referring to FIG. 5, FIG. 5 is a schematic view showing the structure of the second embodiment of a connecting element of the present invention. According to a preferred embodiment of the present invention, left latch element 501 is disposed at left side of left convex bump 503, and right latch element 502 is disposed at right side of right convex bump 504. Support part 5011 of left latch element 501 tilts from the top of the opening towards left convex bump 503, and support part 5021 of right latch element 502 tilts from the top of the opening towards right convex bump 504. When engaged fitly to latch, mold frame and back plate are aligned. Pushing downwards, left latch element 501 and right latch element 502 will slide downward along the outer side of the convex bump until the bottom end. The outer side refers to the corresponding side of left convex bum and right convex bump facing left latch element and right latch element in FIG. 5. Because latch hook part of mold frame has elasticity, top surfaces of latch hook part 505 of left latch element 501 and latch hook part 506 of right latch element 502 hook bottom surface 507 of convex bump, and top surface 508 of latch hook part is higher than bottom surface 507 of convex bump so as to fasten and refrain effectively.

Based on actual technique, the bending angle of latch hook part must be larger than or equal to 90° to ensure that top surface 508 of latch hook part 505 of left latch element 501 and latch hook part 506 of right latch element 502 is higher than bottom surface 507 of convex bump to fasten and refrain effectively when hooking convex bump on the back plate. By disposing the top surface of the latch hook part higher than the bottom surface 507 of convex bump on the back plate, the latch hook part will not spring back to engage during disengaging as well as ensure a tight fit when engaged to latch.

Third Embodiment

Figure 6:
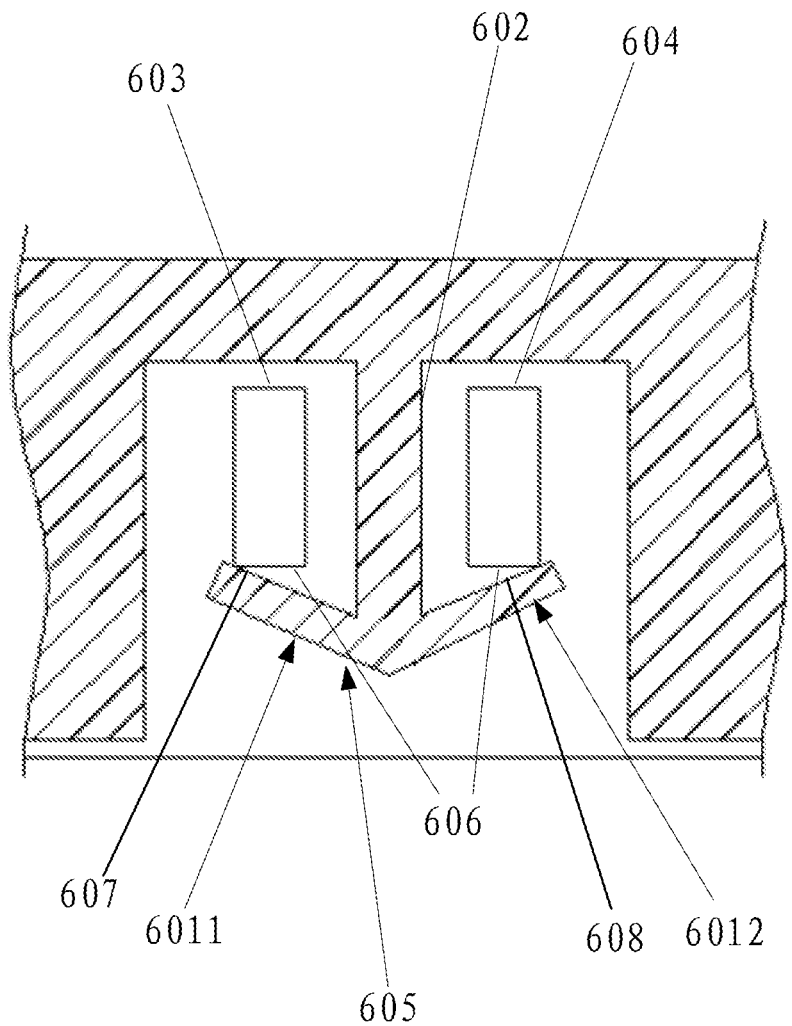
FIG. 6 is a schematic view showing the structure of the third embodiment of a connecting element of the present invention.

Referring to FIG. 6, FIG. 6 is a schematic view showing the structure of the third embodiment of a connecting element of the present invention. According to a preferred embodiment of the present invention, latch unit 605 further comprises a support part 602. Support part 602 and latch hook part are monolithically formed with a bending less than or equal to 90°. The latch hook part comprises a left latch hook 6011 and a right latch hook 6012. Left latch hook 6011, right latch hook 6012 and support part 602 are monolithically formed. Support part 602 is disposed in parallel with left convex bump 603 and right convex bump 604. Convex bump part comprises left convex bump 603 and right convex bump 604. Latch unit 605 is disposed between left convex bump 603 and right convex bump 604, Left latch hook 6011 engages left convex bump 603 and right latch hook 6012 engages right convex bump 604. In this embodiment, left latch hook 6011 and right latch hook 6012 are united through support part 602 to make the mold frame with a better symmetry. In addition, because there is only one support part, when left latch hook 6011 and right latch hook 6012 slide downwards, left latch hook 6011 and right latch hook 6012 are pressed towards the support part by the left and right convex bumps. As such, left latch hook 6011 and right latch hook 6012 have less room for press. Relatively, the present embodiment requires the material for mold frame to have higher elasticity.

When engaged fitly to latch, mold frame and back plate are aligned. Pushing downwards, left latch hook 6011 and right latch hook 6012 will slide downward along the inner side of the convex bump until the bottom end. The inner side refers to the corresponding side of left convex bum and right convex bump facing left latch element and right latch element in FIG. 6. Because latch hook part of mold frame has elasticity, top surfaces of latch hook part 607 of left latch hook 6011 and latch hook part 608 of right latch hook 6012 hook bottom surface 606 of convex bump, and top surface of latch hook part is higher than bottom surface 606 of convex bump so as to fasten and refrain effectively. Based on actual technique, the bending angle of latch hook part must be less than or equal to 90° to ensure that top surface of latch hook part 607 of left latch hook 6011 and latch hook part 608 of right latch hook 6012 is higher than bottom surface 606 of convex bump to fasten and refrain effectively when hooking convex bump on the back plate. This embodiment designs a tilt angle of 80° in the latch hook. Through the structure of mold frame, the structure of the mold frame is simplified to save material cost and improve material utilization.

Fourth Embodiment

Figure 7:
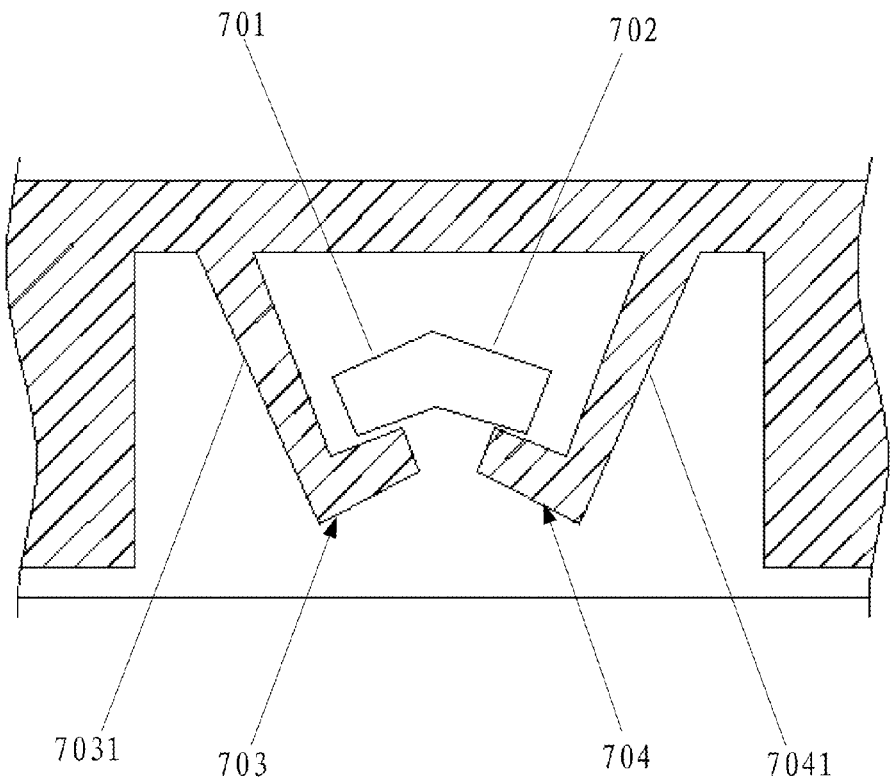
FIG. 7 is a schematic view showing the structure of the fourth embodiment of a connecting element of the present invention.

Referring to FIG. 7, FIG. 7 is a schematic view showing the structure of the fourth embodiment of a connecting element of the present invention. According to a preferred embodiment of the present invention, left convex bump 701n and right convex bump 702 are monolithically formed and show a bend of specific angle. Left latch element 703 is disposed at left side of left convex bump 701, and right latch element 704 is disposed at right side of right convex bump 702. Support part 7031 of left latch element 703 tilts from the top of the opening towards left convex bump 701, and support part 7041 of right latch element 704 tilts from the top of the opening towards right convex bump 702. Through changing the structure of convex bump, this embodiment unites left convex bump 701 and right convex bump 702 and forms an angle, inheriting the mold frame structure of the second embodiment to realize the tight engagement to the back plate as well as prevent springing back when retrieving the latch hook. In other embodiments, the convex bump structure and angle can be irregular polygon shape according to actual application so long as to realize the tight engagement to the back plate as well as prevent springing back when retrieving the latch hook.

In the embodiments of the present invention, the assembly and disassembly methods for the second, the third and the fourth embodiments are similar to the first embodiment. The difference lies in that the latch unit is disposed between the convex bump units, on outer sides of the convex bump unit, or changing the structures of the latch unit or convex bump unit so that the assembly and disassembly method will change in accordance with the design of the structures of the latch unit or convex bump unit. In the mean time, the aforementioned design is only an embodiment of the method of the present invention, either the latch unit is disposed between the convex bump units or on outer sides of the convex bump unit is within the scope of the present invention.

The present invention further provides a backlight module, the back light module comprises the aforementioned connecting element.

In summary, through designing different latch unit structure and different shapes of convex bump unit, the backlight module, connecting element and disassembly method of the present invention can realize the tight engagement and limiting position, effectively prevent the latch hook part of the latch unit of mold frame from restoring due to the elasticity as well as damage caused by repetitive flipping the latch hook part during the disassembly process. The present invention can ensure easy assembly arid disassembly of the mold frame and the back plate as well as reduce cost.

Embodiments of the present invention have been described, but not intending to impose any unduly constraint to the appended claims. Any modification of equivalent structure or equivalent process made according to the disclosure and drawings of the present invention, or any application thereof, directly or indirectly, to other related fields of technique, is considered encompassed in the scope of protection defined by the clams of the present invention.

What is claimed is:

1. A connecting element, which comprises: a mold frame and a back plate; a side of the back plate being disposed with a convex bump unit, the convex bump unit having a bottom surface, a side of mold frame being disposed with an opening, the opening having an elastic latch unit disposed inside, the latch unit having a latch hook part, the latch hook part having a top surface;

wherein the bottom surface of the convex bump unit contacting to push the top surface of the latch hook part so as to make the latch unit and the convex bump unit fitly engaged, a side of the top surface of the latch hook part near free end of the latch hook part being higher than the bottom surface of the convex bump unit.

2. The connecting element as claimed in claim 1, characterized in that the latch unit further comprises a support part, the support part and the latch hook part are monolithically formed with a bending larger than or equal to 90°.

3. The connecting element as claimed in claim 2, characterized in that the latch unit comprises a left latch element and a right latch element, the convex bump unit comprises a left convex bump and a right convex bump, the left latch element engages the left convex bump and the right latch element engages the right convex bump.

4. The connecting element as claimed in claim 3, characterized in that he left latch element and the right latch element are both disposed between the left convex bump and the right convex bump, the support part of the left latch element tilts from the top of the opening towards the left convex bump, and the support part of the right latch element tilts from the top of the opening towards the right convex bump.

5. The connecting element as claimed in claim 3, characterized in that the left latch element is disposed at left side of the left convex bump, the right latch element is disposed at right side of the right convex bump, the support part of the left latch element tilts from the top of the opening towards the left convex bump, and the support part of the right latch element tilts from the top of the opening towards the right convex bump.

6. The connecting element as claimed in claim 1, characterized in that the latch unit further comprises a support part, the support part and the latch hook part are monolithically formed with a bending less than or equal to 90°; the latch hook part comprises a left latch hook and a right latch hook, the left latch hook, the right latch hook and the support part are monolithically formed; the support part is disposed in parallel with the left convex bump and the right convex bump; the convex bump part comprises the left convex bump and the right convex bump; the latch unit is disposed between the left convex bump and the right convex bump, the left latch hook engages the left convex bump and the right latch hook engages the right convex bump.

7. The connecting element as claimed in claim 3, characterized in that the left convex bump and the right convex bump are monolithically formed and show a bend of specific angle; the left latch element is disposed at left side of the left convex bump, the right latch element is disposed at right side of the right convex bump, the support part of the left latch element tilts from the top of the opening towards the left convex bump, and the support part of the right latch element tilts from the top of the opening towards the right convex bump.

8. A backlight module, which comprises a mold frame and a back plate, a side of the back plate being disposed with a convex bump unit, the convex bump unit having a bottom surface, a side of mold frame being disposed with an opening, the opening having an elastic latch unit disposed inside, the latch unit having a latch hook part, the latch hook part having a top surface;
wherein the bottom surface of the convex bump unit contacting to push the top surface of the latch hook part so as to make the latch unit and the convex bump unit fitly engaged, a side of the top surface of the latch hook part near free end of the latch hook part being higher than the bottom surface of the convex bump unit.

9. The backlight module as claimed in claim 8, characterized in that the latch unit further comprises a support part, the support part and the latch hook part are monolithically formed with a bending larger than or equal to 90°.

10. The backlight module as claimed in claim 9, characterized in that the latch unit comprises a left latch element and a right latch element, the convex bump unit comprises a left convex bump and a right convex bump, the left latch element engages the left convex bump and the right latch element engages the right convex bump.

11. The backlight module as claimed in claim 10, characterized in that he left latch element and the right latch element are both disposed between the left convex bump and the right convex bump, the support part of the left latch element tilts from the top of the opening towards the left convex bump, and the support part of the right latch element tilts from the top of the opening towards the right convex bump.

12. The backlight module as claimed in claim 10, characterized in that the left latch element is disposed at left side of the left convex bump, the right latch element is disposed at right side of the right convex bump, the support part of the left latch element tilts from the top of the opening towards the left convex bump, and the support part of the right latch element tilts from the top of the opening towards the right convex bump.

13. The backlight module as claimed in claim 8, characterized in that the latch unit further comprises a support part, the support part and the latch hook part are monolithically formed with a bending less than or equal to 90°; the latch hook part comprises a left latch hook and a right latch hook, the left latch hook, the right latch hook and the support part are monolithically formed; the support part is disposed in parallel with the left convex bump and the right convex bump; the convex bump part comprises the left convex bump and the right convex bump; the latch unit is disposed between the left convex bump and the right convex bump, the left latch hook engages the left convex bump and the right latch hook engages the right convex bump.

14. The backlight module as claimed in claim 10, characterized in that the left convex bump and the right convex bump are monolithically formed and show a bend of specific angle; the left latch element is disposed at left side of the left convex bump, the right latch element is disposed at right side of the right convex bump, the support part of the left latch element tilts from the top of the opening towards the left convex bump, and the support part of the right latch element tilts from the top of the opening towards the right convex bump.

15. A disassembly method for connecting element, which comprises:
a push and press step, pushing and pressing the latch unit in a direction away from the convex bump unit on the back plate so that the latch unit showing elastic deformation to disengage from the bottom surface of the convex bump unit and push against a side of the convex bump unit; and
a raise and disengage step, raising the mold frame, the latch unit sliding upwards along the side of convex bump unit to disengage the latch unit from the convex bump unit.

* * * * *